United States Patent [19]

Young

[11] 3,902,808
[45] Sept. 2, 1975

[54] DEVICE FOR SPECTROSCOPIC MEASUREMENTS OF GAS COMPOSITION AFTER ADDITION OF HELIUM

[76] Inventor: Robert A. Young, R.R. No. 2, Loretto, Ontario, Canada

[22] Filed: July 12, 1974

[21] Appl. No.: 488,185

[52] U.S. Cl. .................................. 356/74; 356/85
[51] Int. Cl.² ...................... G01J 3/02; G01J 3/30
[58] Field of Search .......... 356/74, 85, 96, 98, 244, 356/246; 250/372, 373, 492–494

[56] References Cited
UNITED STATES PATENTS
3,805,077   4/1974   D'Silva.................................. 356/85

Primary Examiner—Ronald L. Wibert
Assistant Examiner—F. L. Evans
Attorney, Agent, or Firm—John E. Benoit

[57] ABSTRACT

A device for spectroscopic measurement of a gas composition wherein a helium resonance lamp includes a window partially transparent to radiation at 584A which is emitted by said lamp, the window being within a chamber. The gas to be sampled is mixed with He and placed in the chamber and the lamp is excited. Spectral radiation from the chamber is viewed and analyzed through an observation window.

3 Claims, 2 Drawing Figures

DEVICE FOR SPECTROSCOPIC MEASUREMENTS OF GAS COMPOSITION AFTER ADDITION OF HELIUM

This invention relates generally to a device for spectroscopic measurements and more specifically to such a device for measurements of the composition of gases to which helium has been added.

Devices for spectroscopic and spectrographic identification and measurement of the concentration of elements and compounds all have the following devices in common: 1) a means to separate and measure the brightness of narrow wavelength bands (spectrometers, spectrographs) 2) a means to excite the elements or compounds to quantum states above the lowest one, such that the compound element radiates light characteristic of its structure and its brightness is a function of its concentration, and 3) means for coupling the light to the analyzing devices.

There are a few means for exciting gases when their total pressure exceeds 0.1 atmosphere (76 torr) since electrical discharge processes work poorly at high pressures or so completely modify the gas sample (high pressure arcs) that they are not useful.

The present invention overcomes these disadvantages by depositing energy selectively into the electronic energy of a helium additive to the gas sample which by various process is effectively converted to light indicative of the composition of the gas sample, without changing the sample or causing other unwanted effects. It further has the advantage of being small, light weight, low power and applicable over a great pressure range.

Figure 1:
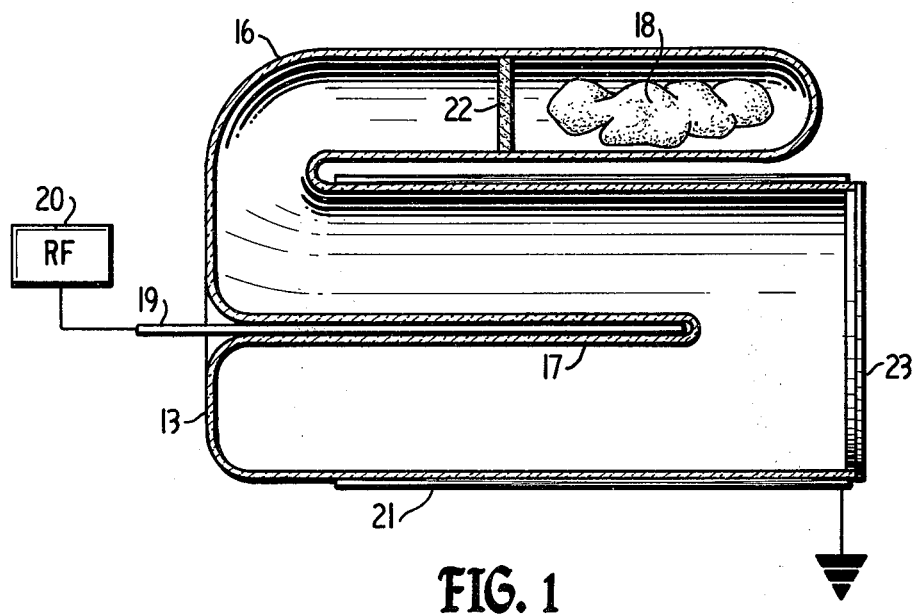
Figure 2:
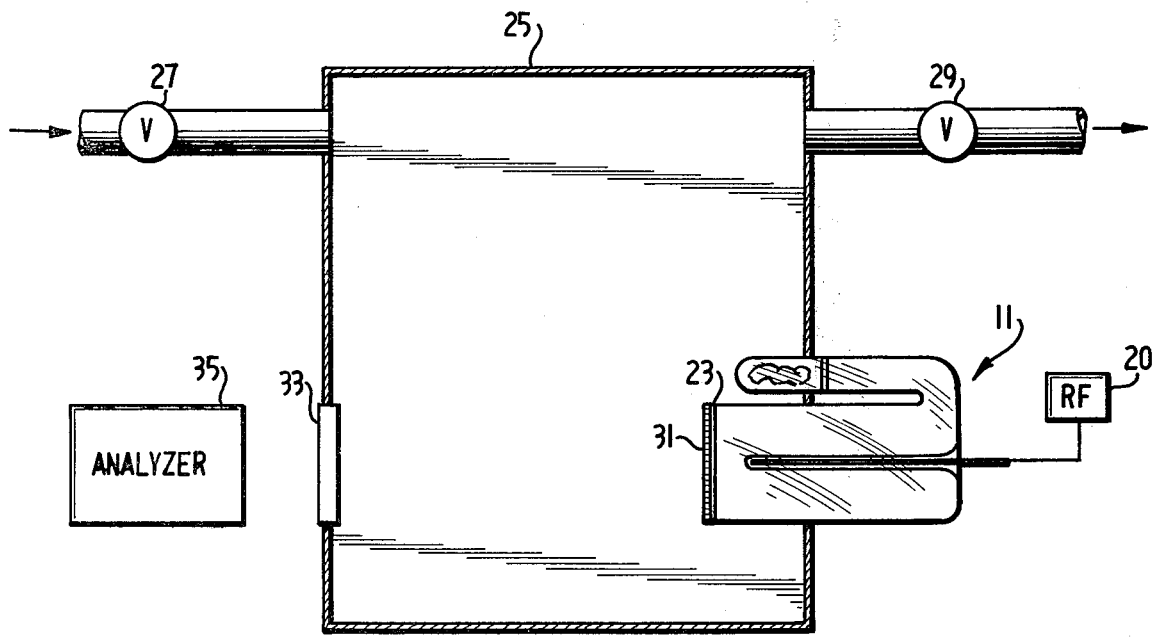

These and other objects and advantages of the present invention will become apparent from the following description taken in conjunction with the drawings wherein FIG. 1 is a schematic illustration of a helium resonance lamp used in the preferred embodiment of the invention; and FIG. 2 is a schematic showing of the device of the present invention.

Broadly speaking the present invention relates to a device for spectroscopic measurement of a gas composition wherein a helium resonance lamp includes a window partially transparent to radiation at 584A which is emitted by said lamp, the window being within a chamber. The gas to be sampled is placed in the chamber and the tube is excited. Spectral radiation from the chamber is viewed and analyzed through an observation window.

Turning now to FIG. 1 there is shown therein a preferred embodiment of a helium resonance lamp used in the present invention. The basic structure of the lamp is described in U.S. Patent Application Ser. No. 426,616 entitled Low Power Sealed Optically Thin Resonance Lamps, filed in the name of the present inventor.

Basically, the lamp 11 comprises a hollow cylindrical body 13 having a dielectric wall, such as glass, with a reentrant coaxial hollow glass element 17 located centrally within body 13. An electrical conductor 19 is connected to a source of RF energy 20. An integral arm 16 extends from cylindrical body 13 and contains a material 18 which acts as a getter such as uranium or barium. A gas permeable filter 22 such as glass frit maintains material 18 in position. Cylindrical body 13 is filled with high purity helium and a thin window 23, preferably of aluminum, is provided so as to pass only the desired radiation.

Window 23 is partially transparent to 584A radiation. The helium gas within cylindrical body 13 is maintained at a pressure between 0.1 and 100 torr.

Thus, there is provided a helium resonance lamp having an emission at substantially 584A with a thin, i.e. 1000A, window partially transparent to 584A radiation. The window 23 is designed so as to be able to withstand high pressure when immersed in a gas mixture such as a mixture wherein one of the components is helium at a pressure between 0.1 and 100 torr.

The cylindrical body may be covered by an electrically conductive material 21 which is electrically grounded as is schematically shown. An example of a means for accomplishing this is when cylindrical lamp body 13 is enclosed within a close fitting conductive housing which is grounded. Therefore, the lamp body is effectively sheathed by a grounded conductive element. This element completes the necessary path for electrical excitation by RF source 20.

When lamp 11 is electronically excited by the RF source 20, helium radiation is passed by the window and absorbed by He outside the lamp and, subsequently, this energy is transferred from the helium to other components of the gas mixture. This transfer may occur either directly, or through collisions of electrons, whose energy has been increased by superelastic interactions with excited helium, or as a consequence of ion neutralization (either with a free electron or with an attached electron in the form of a negative ion).

Of those materials which pass 584A, aluminum is preferred for practical reasons.

Turning now to FIG. 2 there is shown a system for the spectroscopic measurement of a gas composition containing helium. The lamp 11 of FIG. 1 is placed so that the window 23 is within a gas chamber 25. Gas passes into and out of the chamber through valves 27 and 29 respectively.

The gas mixture contains about 10 torr of helium and the gas constituents to be measured and is at a total pressure of from 100 torr to 10,000 torr and flows into and out of the gas chamber 25.

The helium resonance lamp 11 powered by the RF exciter 20 emits from $10^{14}$ photons per square centimeter to $10^{15}$ photons per square centimeter through the aluminum window 23. This emission is absorbed by the helium in the gas mixture within the gas chamber 25 and causes excitation of all constituents of the gas mixture in a thin film 31 adjacent to aluminum window 23.

By various processes, in many ways very similar to those occurring in an electrical discharge or in electron beam excitation regions the constituents of the gas mixture, their ions, or products of plasma reactions, are vibrationally, rotationally, and electronically excited and, as a consequence, emit electromagnetic energy. This radiation is characteristic of the gas composition and may be analyzed, for example, by a spectrograph or a monochromator 35 viewing the excited gas through window 33 and thus measure the composition of the gas mixture within the chamber 25.

There is thus provided a gas composition measuring device which is relatively small, light weight, low power and operates over a great pressure range.

The above description and drawings are illustrative only since equivalents could be substituted without departing from the invention. Accordingly, the invention is to be limited only by the scope of the following claims.

I claim:

1. A device for spectroscopic measurement of a gas composition comprising a helium resonance lamp having an emission at 584A;

a window in said lamp partially transparent to radiation at 584A;

a chamber surrounding said window;

an observation window in said chamber for viewing said window;

means for supplying a gas containing helium and at least one constituent to said chamber; and analyzer means adjacent said observation window and exterior of said chamber for viewing the spectral radiation from said chamber through said observation window.

2. The device of claim 1 wherein said window in said lamp is aluminum.

3. The device of claim 2 wherein said emission from said lamp is absorbed by the helium in the gas mixture and causes excitation of the constituent in a thin film adjacent said window.

* * * * *